US012348631B2

(12) United States Patent
Kancharla et al.

(10) Patent No.: US 12,348,631 B2
(45) Date of Patent: Jul. 1, 2025

(54) SYSTEM AND METHOD OF PROVISIONING TRANSPARENCY USING TRUSTED SECURE CHAINED VISIBILITY WITH CUSTOMER CONSCIENCE

(71) Applicant: Dell Products L.P., Round Rock, TX (US)

(72) Inventors: Mahesh Kumar Kancharla, Hyderabad (IN); Sisir Samanta, Round Rock, TX (US); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 251 days.

(21) Appl. No.: 18/140,069

(22) Filed: Apr. 27, 2023

(65) Prior Publication Data

US 2024/0364508 A1  Oct. 31, 2024

(51) Int. Cl.
*H04L 29/06* (2006.01)
*H04L 9/00* (2022.01)
*H04L 9/08* (2006.01)

(52) U.S. Cl.
CPC .......... *H04L 9/0891* (2013.01); *H04L 9/0861* (2013.01); *H04L 9/50* (2022.05)

(58) Field of Classification Search
CPC ....... H04L 9/0891; H04L 9/0861; H04L 9/50; H04L 9/3239
See application file for complete search history.

(56) References Cited

U.S. PATENT DOCUMENTS

| | | | |
|---|---|---|---|
| 11,171,939 B1* | 11/2021 | Blank | ..................... H04L 63/18 |
| 2020/0084020 A1* | 3/2020 | Fazzone | .............. H04L 63/0876 |
| 2021/0226951 A1* | 7/2021 | Goldstein | ............... H04L 63/20 |
| 2021/0289001 A1* | 9/2021 | Wilson | .................. G06Q 10/103 |
| 2022/0174052 A1* | 6/2022 | Blank | ................... G06Q 10/107 |
| 2024/0364508 A1* | 10/2024 | Kancharla | ............. H04L 9/0891 |
| 2025/0063068 A1* | 2/2025 | Wilson | ................ H04L 63/0876 |

* cited by examiner

*Primary Examiner* — Mahfuzur Rahman
(74) *Attorney, Agent, or Firm* — Terrile, Cannatti & Chambers, LLP; Emmanuel A. Rivera

(57) ABSTRACT

A system, method, and computer-readable medium for authentication as to resources of a subscription for a customer for particular resources that include hardware and software. A distributed ledger, such as a block chain support a main subscription channel. Factory entities of the provider of the resources write to a sub distributed ledger of the distributed ledger, where the sub distributed ledger is related to a factory subscription channel. Third party vendors of the provider of the resources write to another sub distributed ledger of the distributed ledger, where this sub distributed ledger is related to a vendor subscription channel. The distributed ledger of the main subscription channel is updated with provisioning of the resources. An authenticity view is provided as to updated main subscription channel.

17 Claims, 6 Drawing Sheets

SYSTEM AND METHOD OF PROVISIONING TRANSPARENCY USING TRUSTED SECURE CHAINED VISIBILITY WITH CUSTOMER CONSCIENCE

BACKGROUND OF THE INVENTION

Field of the Invention

The present invention relates to providing information as to subscription services provided to customers. More specifically, embodiments of the invention provide a system, method, and computer-readable medium for transparency and authentication as to resources and subscriptions used by customers.

Description of the Related Art

Enterprises, such as customers, employ various resource that include computing software and hardware, at their facilities. Such resources may include subscriptions to use such resources. The subscriptions can be tied to licenses issued or assigned by providers, such as original equipment manufacturers (OEM) to the customers. Customers can rely on vendors to provide such resources, subscriptions and licenses.

Providers may provide services and solutions by a cloud service. A cloud service can provide solutions as Information as a Service (IaaS), Product as a Service (PaaS), or Software as a Service (SaaS). In a cloud service, traditional provisioning and licensing may not serve a customer having specific resource requirements and needs. The cloud service can provide numerous and almost unlimited availability of resources; however, the customer is billed as to what the customer uses, subscribes to, or is entitled to, and not what is provisioned.

Providers may use hardware and software that is manufactured, provided and supported by different third party suppliers or vendors. Hardware and software resources may be integrated at customer site. The infrastructure of the hardware and software resources may be managed by the provider. A cloud service can offer specific outcomes to customers; however, a customer does not buy or commit to the all the offerings of the third party suppliers. A customer subscribes to a specific subscription offering, and the vendor deals with different and various third parties to provision the hardware and software resources to meet the subscription offering. The customer should know the specific provisioning of the subscription offering to assure the customer that expectations are met. When a provider promises the customer that the solution will include particular resources and services, the customer should be aware that resources and services are actually being provided.

In certain cases, a service (e.g., cloud service) provides auto renewal, where a subscription term is automatically extended at the end of a current contract term. Providers need to assure customers of the accuracy of extending the provisioning and licensing of resources. In certain instances, timely replacement and/or replenishment of resources are needed for desired outcomes of subscriptions. A level of authenticity and transparency is needed among various parties, including the provider, customer, third party vendors, and others.

SUMMARY OF THE INVENTION

A computer-implementable method, system and computer-readable storage medium for authentication as to resources of a subscription for a customer comprising receiving an order for the subscription; updating a distributed ledger of a main subscription channel with the subscription; creating private keys related to a factory service tag of the subscription; updating a sub distributed ledger of a factory subscription channel that is a level below the main subscription channel; creating private keys related to vendor licenses of the subscription; updating another sub distributed ledger of a vendor subscription channel that is a level below the main subscription channel; updating the distributed ledger of the main subscription channel with keys related to provisioning of the resources; and providing an authenticity view based on updated main subscription channel.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Described herein are implementations providing authenticity and transparency as to subscriber outcomes versus provisioned resources as to various stakeholder parties, including original equipment manufacturers (OEM) providers, provider manufacturing entities, managed services, third party vendors, customers, etc. Implementations provide for subscribed offers and related resource authenticity view to stakeholder parties.

Various implementations provide that when subscriptions offers are presented or changed (e.g., renewal, upgrade, downgrade) consent is provided from stakeholder parties, including customer, vendor, and OEM. An authenticity view is updated and provided as to subscriptions changes. Changes can be initiated by customers.

Authenticity view provides for authentication and transparency amongst the stakeholder parties fulfilling or provisioning resources and licenses. Implementation provide for a subscription life cycle blockchain (i.e., distributed ledger) that is instantiated during subscription offering and managed throughout the lifecycle of the subscription, where each circle (i.e., block) of the blockchain includes sub-ledger circles (i.e., blocks) that manage promised versus fulfilled resources circles (i.e., blocks) trust amongst parties.

Embodiments provide that the blockchain (i.e., distributed ledger) implements double blockchain techniques with customer consciences in subscription offers. Data generating the authenticity view is agreed and signed upon by the stakeholder parties involved in provisioning. Vendor license keys and provision securing keys are implemented in pairs in the blockchain (i.e., distributed ledger).

Figure 1:
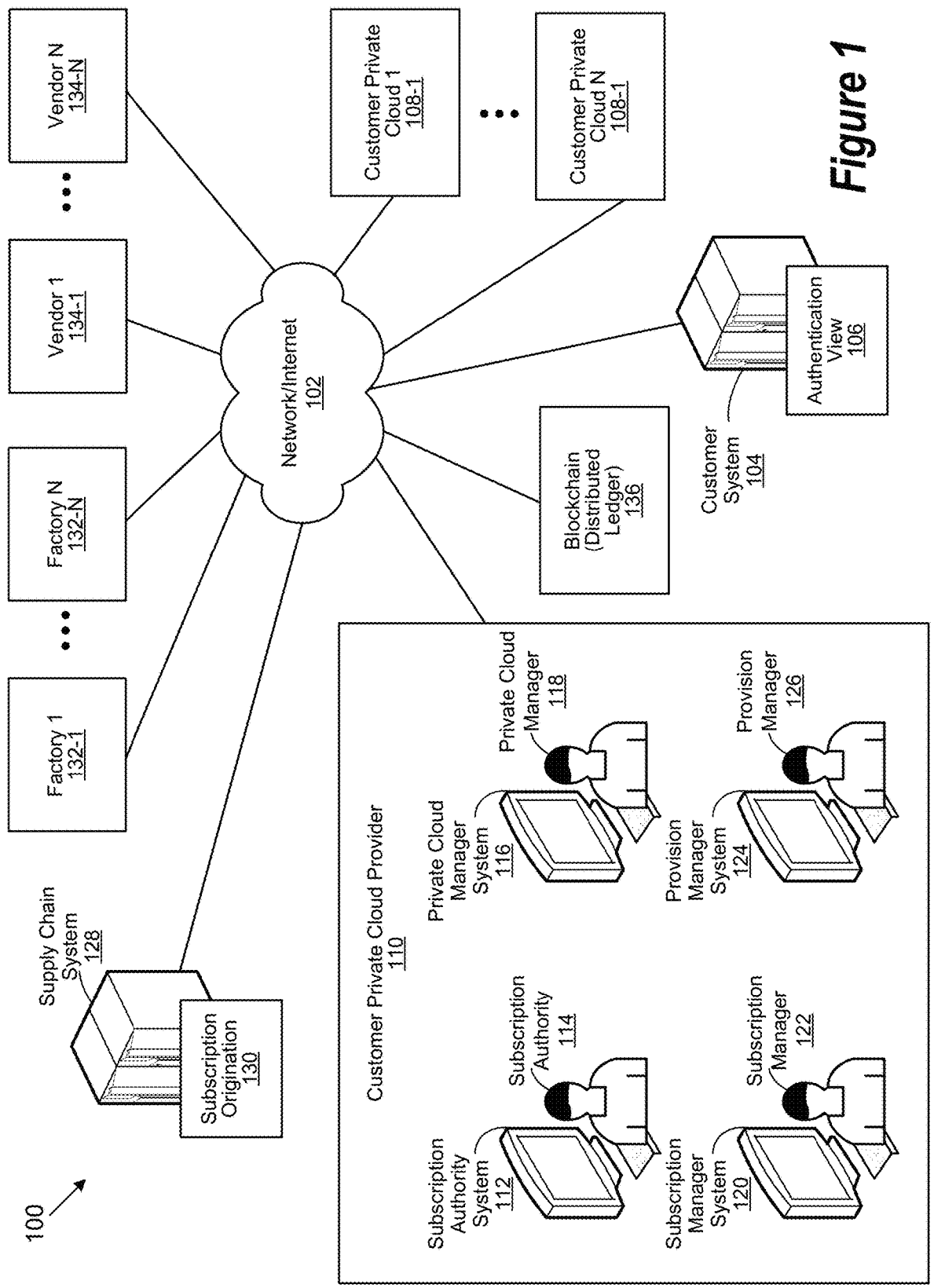
FIG. 1 is a system as implemented in the present invention.

FIG. 1 shows a system 100 for implementing the processes of the described invention. In particular, system 100 provides for transparency and authentication as to resources and subscriptions used by customers. The system includes a network 102, where network 102 can include one or more wired and wireless networks, including the Internet. Network 102 is likewise accessible by the elements of system 100.

Various embodiments provide for the use of cloud services to support customers. Customers are entities/enterprises that subscribe to particular resources, including hardware and software. Implementations include the resources physically installed and supported at a customer site(s). The resources are provided with subscriptions and licenses specific to a customer.

A customer is represented by customer system 104. At the customer system 104, an authentication view 106 is provided. The authentication view 106 can be implemented as a graphical user interface, and provides authentication and transparency as to resources and subscriptions of a customer. The authentication view 106 is updated as to changes in the subscriptions of the customer, including changes performed by the customer.

Implementations provide for the system 100 to include one or more customer private cloud services 108. A customer private cloud service 108 is specific to a customer/customer system 104. Various implementations provide for a customer private cloud provider 110 that provides the customer private cloud services 108. The customer private cloud service 108 can support an OEM that provides resources to customers.

Various embodiments provide for the customer private cloud provider 110 to include a subscription authority system 112, accessed by a subscription authority 114. In general, the subscription authority system 112 is used as an arbiter to approve/reject requests for provisioning of resources.

The customer private cloud provider 110 can include private cloud manager system 116, accessed by a private cloud manager 118. The private cloud manager system 116 can be or be a part of managed service for customers. In particular, the cloud manager system 116 manages the customer sites and customer private cloud services 108. Once approval of provisioning is provided by subscription authority system 112, the cloud manager system 116 updates a customer site with the resources, including providing any keys needed for provisioning. Implementations provide for the cloud manager system 116 to receive consent from customers/customer system 104 for resource deployment.

Implementations provide for the customer private cloud provider 110 to include subscription manager system 120, accessed by a subscription manager 122. The subscription manager system 120 can be a request initiator for the system 100. Based on customer requests/orders that are placed by customer system 102, specific provisioning/licenses or entitlements are created for the customer. In particular, as further described herein, a "genesis" (i.e., initial) block can be created in a blockchain (i.e., distributed ledger) which includes order/subscription details.

The private cloud provider 110 can include provision manager system 124, access by a provision manager 126. As further described herein, provision manager system 124 receives private keys for a customer site and provisions/deploys the necessary software and license to a customer.

Implementations provide for the system 100 to include supply chain system 128 which supports origination of customer subscriptions throughout lifecycle of the subscription. Subscription originations 130 are included in the supply chain system 128. The supply chain system 128 and customer private cloud 108 can be part of managed services and in certain implementations a merge center, for the OEM of the resources.

The system 100 can include factory entities 132 and vendors 134. Factory entities 132 can be part of the OEM that provides resources to customers.

Vendors 134 can be third party suppliers providing resources (e.g., hardware, software, etc.). As further described herein, factory entities 132 can update a blockchain (i.e., distributed ledger) with details of manufacturing resources according to a customer's subscription. Vendors 134 can accept vendor entitlement orders and update any license keys and software for provisioning.

Implementations provide for the system 100 to include a blockchain or distributed ledger 136. The blockchain 136 provides for all information in authentication view 106 and as further described herein is accessed by the entities/parties of system 100.

Figure 2:
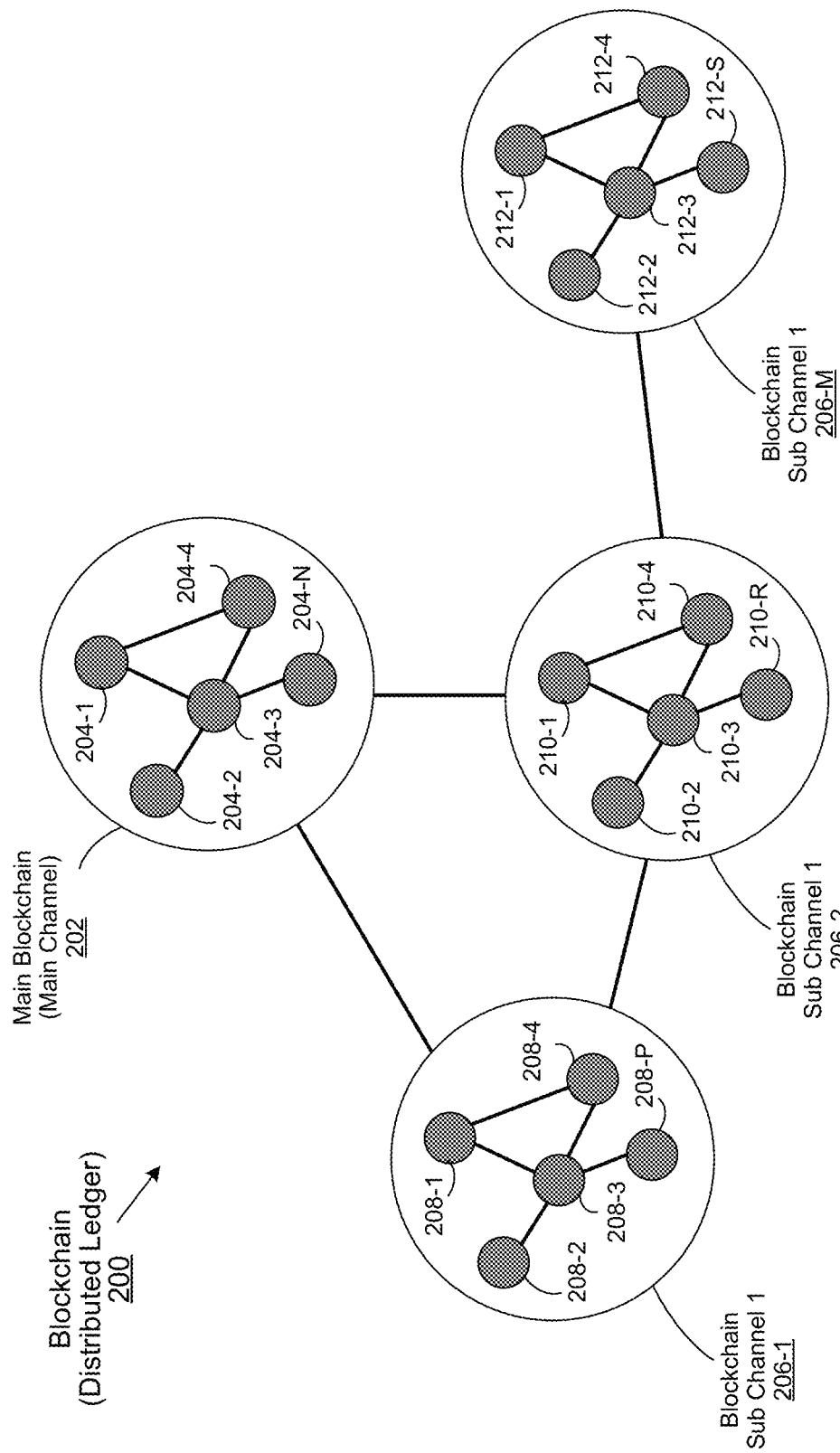
FIG. 2 is a simplified diagram of a distributed ledgers/blockchains as implemented in the present invention.

FIG. 2 shows an example of the blockchain or distributed ledger 200 as implemented in the invention. In particular, the blockchain 200 is implemented as the blockchain or distributed ledge 136 described above. In various implementations, the blockchain 200 is a multilevel blockchain such as a two level blockchain, that includes a main blockchain 202 that is made of multiple blocks 204-1 to 204-N. The blockchain 200 includes sub blockchains 206-1 to 206-M. The sub blockchains 206 respectively are made of multiple blocks 208-1 to 208-P, 210-1 to 210-R, and 212-1 to 212-S. As described herein, actions of entities of system 100, are written to blockchain 200, and particularly to the respective blocks 204, 208, 210, and 212.

As discussed, implementations provide the blockchain 200 is a two level blockchain, where the main blockchain 202 is a subscription life cycle channel that represents a subscription life cycle. One of the sub blockchains 206 is a factory channel, and another sub blockchain 206 is a vendor channel. Implementations provide for the main blockchain 202 or subscription life cycle channel to be open indefinitely, until a customer subscription ends. The factory channel (i.e., one sub blockchain 206) and the vendor channel (i.e., other sub blockchain 206) are short lived and commit their results to the main blockchain 202 or subscription life cycle channel.

Figure 3:
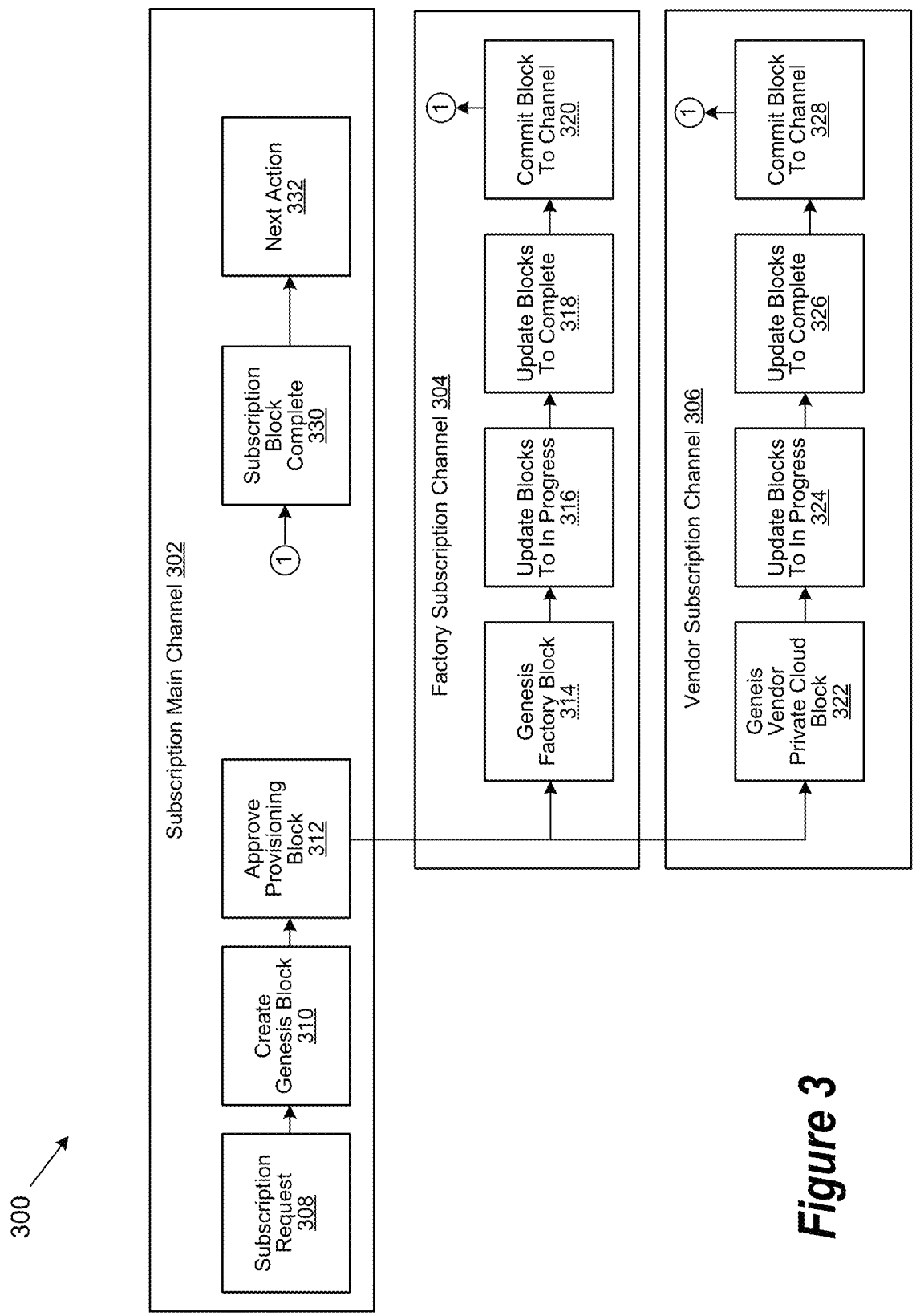
FIG. 3 is a simplified diagram of subscription channels.

FIG. 3 shows a diagram 300 of subscription channels. Implementations provide that a subscription main channel 302 is associated to a main distributed ledger blockchain, such as main blockchain 202. The subscription main channel 302 is a subscription life cycle for a customer. A factory subscription channel 304 is associated to a sub distributed ledger blockchain, such as a sub blockchain 206, where blocks in a blockchain (e.g., a sub blockchain 206) are blocks for factory entities (e.g., factory 132). A vendor subscription channel 306 is associated to a sub distributed ledger blockchain, such as another sub blockchain 206, where blocks in a blockchain (e.g., another sub blockchain 206) are blocks for vendor entities (e.g., vendor 134). Therefore, in this example, there is a three channel blockchain.

As discussed, the main blockchain 202 or subscription main channel 302 can be open indefinitely, until a customer subscription ends. The factory channel 304 (i.e., one sub blockchain 206) and the vendor channel 306 (i.e., other sub blockchain 206) are short lived and commit their results to the main blockchain 202 or subscription life cycle channel.

In various implementations, a customer or customer system 104 initiates a request subscription request 308 to the subscription main channel 302. A subscription manager 122 through a subscription system 120 initiates or creates a genesis or initial block 310. The subscription authority 114, through the subscription authority system 112 approves the subscription request by writing to a block 312 in main blockchain 202 or subscription main channel 302.

Once the provisioning block 312 is approved at the main blockchain 202 or subscription main channel 302, a factor entity (ies) 132 through the factory channel 304 or a sub blockchain 306, can create or write to the following blocks. Create or write to a genesis or initial factory block 314. Create or update blocks to in progress 316. Create or update blocks to complete 318. Commit blocks to the factory channel (i.e., factory channel 304) 320.

Once the provisioning block 312 is approved at the main blockchain 202 or subscription main channel 302, a vendor entity (ies) 134 through the factory channel 306 or other sub blockchain 306, can create or write to the following blocks. Create or write to a genesis or initial vendor private cloud block 314. Create or update blocks to in progress 324. Create or update blocks to complete 326. Commit blocks to the vendor channel (i.e., vendor channel 306) 328.

Once blocks in factory channel 304 and vendor channel 306 are committed, blocks 320 and 328, the subscription manager 122 through a subscription system 120 writes to a block that the subscription block is complete 330 at the main blockchain 202 or subscription main channel 302. Next action can be taken 332 as to the main blockchain 202 or subscription main channel 302.

Figure 4:
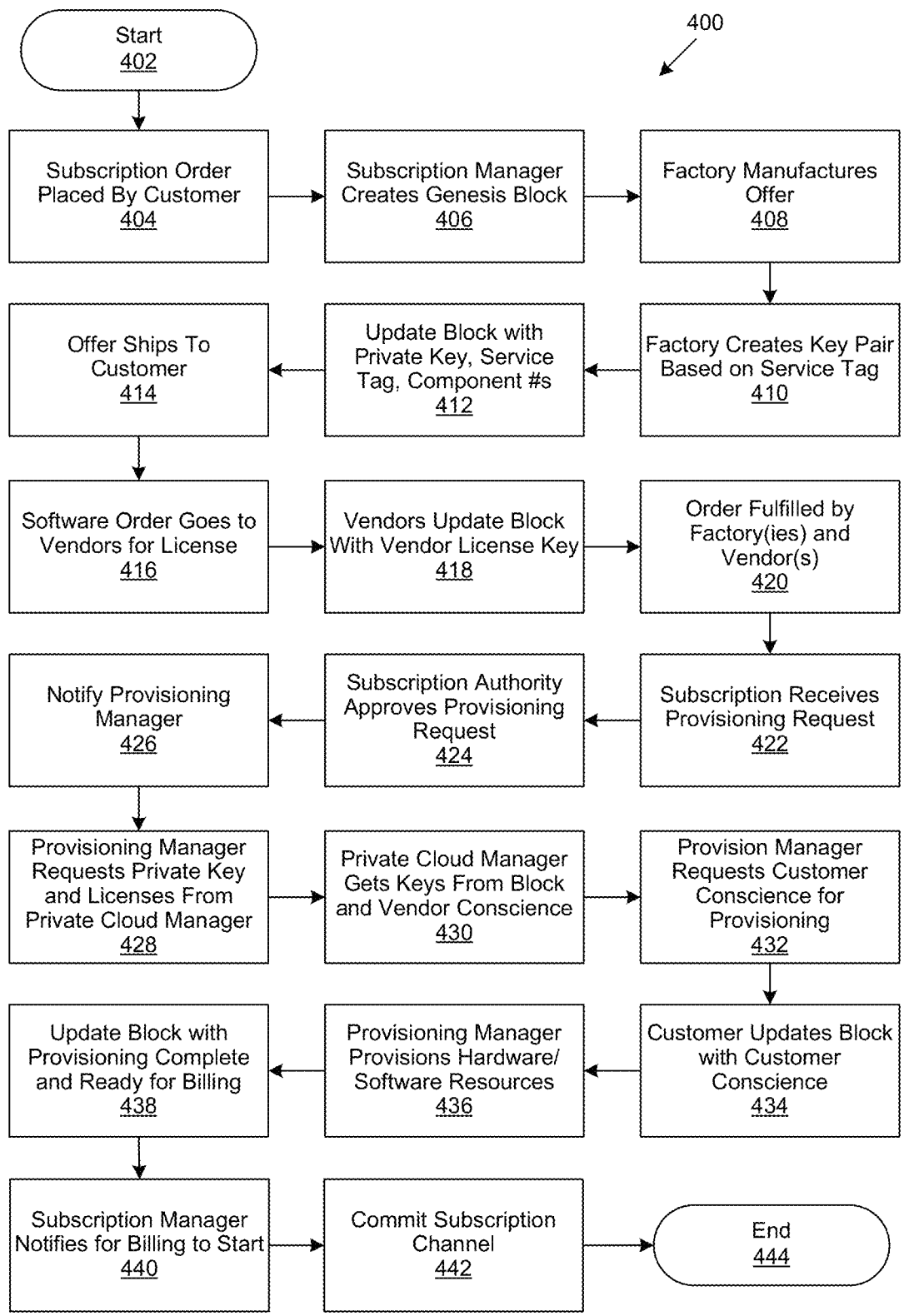
FIG. 4 is a general flowchart for a subscription blockchain over the lifecycle of the subscription.

FIG. 4 is a generalized flowchart 400 for a subscription blockchain over the lifecycle of the subscription. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402 the process 400 starts. At step 404, customer through customer system 104 orders a subscription for particular subscribe to particular resources, including hardware and software from a provider, such as equipment manufacturers (OEM).

At step 406, before production/provisioning of the resources to the customer, subscription manager 120 through subscription manager system 122 creates a genesis or initial block on the blockchain of the subscription channel 302. This block can include details and entitlement to the customer.

At step 408, factory entities 132 produce/manufacture the customer order and provide a service tag as to the customer order. At step 410, the factory entities 132 using the service tag, creates a key pair, including a private key and public key. The key pair can be generated using known encryption technologies. The public key can be available through a secret path.

At step 412, a block in blockchain of the factory subscription channel 304 can be updated with private key, service tag, unique component numbers, etc. that are used for system of the customer order. At 414, the customer order (resources of the order) is shipped to the customer/customer site.

At step 416, software (resource) orders goes to vendors 134 for licenses to the customer. At step 418, vendors 134 update the block on vendor subscription channel 306 with vendor license key with conscience/awareness (i.e., current subscription status) to the customer.

At step 420, the customer order is fulfilled by factory entities 132 and vendors 134, and subscription manager 122 receives notification through subscription manager system 120. At step 422, the subscription manager 122 receives notification through subscription manager system 120 provisioning request from the block chain of the subscription channel 302.

At step 424, the subscription authority manager 114, through subscription authority system 112 approves the provisioning request. At step 426, the provision manager 126 through the provision manager system 124, gets a notification that the provisioning request is approved.

At step 428, the provision manager 126 through the provision manager system 124 requests for private keys and licenses to the private cloud manager system 116/private cloud manager 118. At step 430, the private cloud manager 118 through the private cloud manager system 116 gets from the block of the blockchain of the vendor channel 306, private keys and vendor conscience/awareness (i.e., current subscription status).

At step 432, the provision manager 126 through the provision manager system 124 requests customer conscience/awareness (i.e., current subscription status) for provisioning. At step 434, the customer updates the block of the blockchain of the subscription channel 302 with customer conscience/awareness (i.e., current subscription status).

At step 436, the provision manager 126 through the provision manager system 124 provisions hardware and/or software resources to the customer. At step 438, the provision manager 126 through the provision manager system 124 writes to/updates the block of the blockchain of the subscription channel 302 that provisioning is complete, and that billing to the customer is ready.

At step 440, the subscription manager 122 through the subscription manager system 120 provides notification that billing to the customer can start. At step 442, the subscription channel 302 can be committed. At step 444, the process 400 ends.

Figure 5:
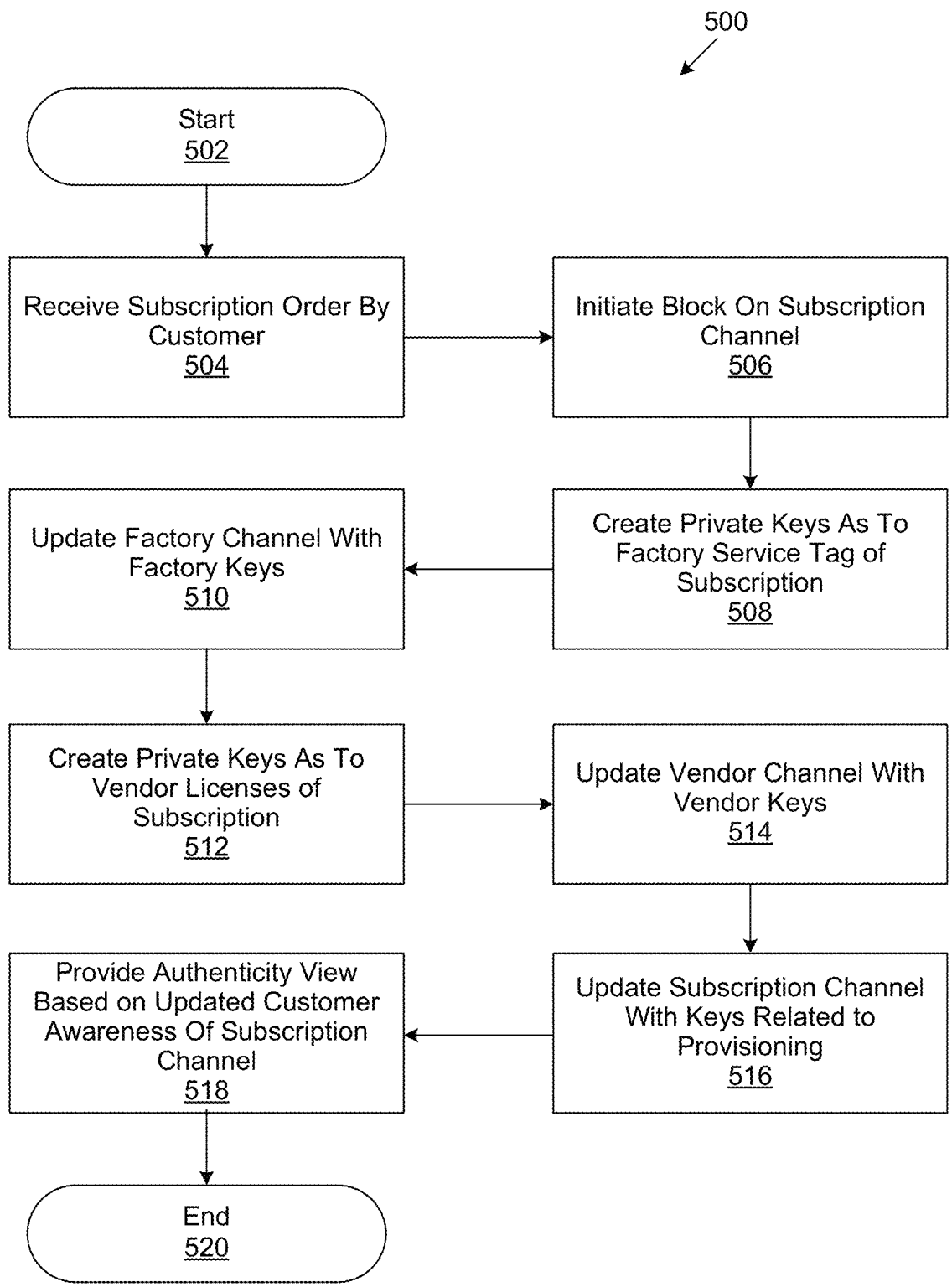
FIG. 5 is a general flowchart for transparency and authentication as to resources and subscriptions used by customers.

FIG. 5 is a generalized flowchart 500 for transparency and authentication as to resources and subscriptions used by customers. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502 the process 500 starts. At step 504, a subscription order is received from a customer as to resources that include hardware and software. At step 506, a block of a distributed ledger/blockchain as to a subscription channel is initiated as to the subscription of the customer.

At step 508, private keys are created as to a factory service tag related to the customer subscription. At step 510, a block is updated with the private keys, where the block is of a distributed ledger/blockchain that is a sub distributed ledger/blockchain of the distributed ledger/blockchain of the subscription channel, where the sub distributed ledger/blockchain is to a factory subscription channel.

At step 512, private keys are created as to a vendor licenses related to the customer subscription. At step 514, a block is updated with the private keys, where the block of a distributed ledger/blockchain that is a sub distributed ledger/blockchain of the distributed ledger/blockchain of the subscription channel, where the sub distributed ledger/blockchain is to a vendor subscription channel.

At step 516, the subscription channel is updated with keys related to provisioning of the resources. At step 518, an authenticity view is provided based on customer awareness of the updated distributed ledger/blockchain of the subscription channel. At step 520, the process 500 ends.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 6:
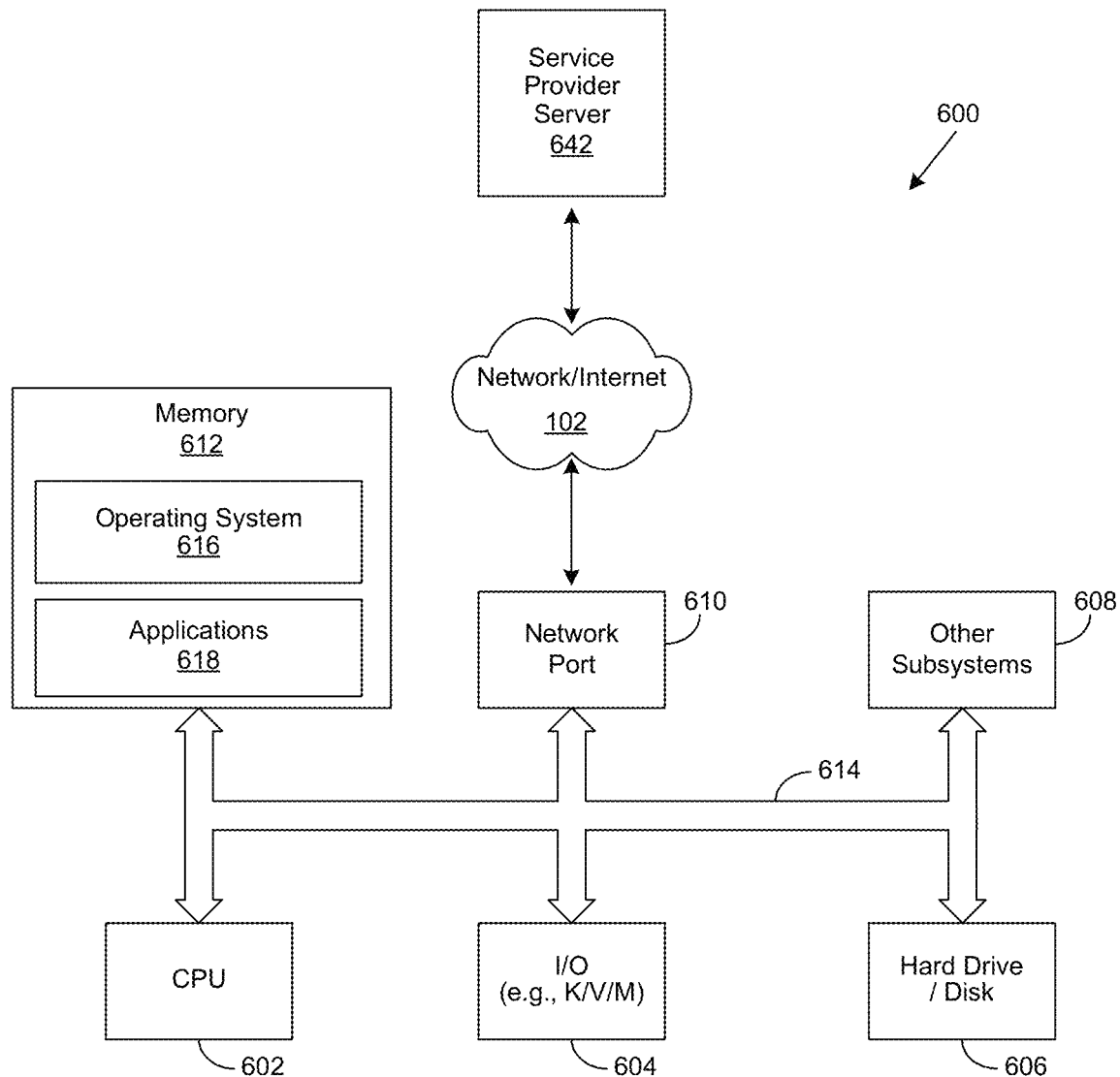
FIG. 6 is general illustration of components of an information handling system.

FIG. 6 is a generalized illustration of an information handling system 600 that can be used to implement the system and method of the present invention, such as by the elements described in FIG. 1. The information handling system 100 connects with the network 102 as described in FIG. 1, where network 140 can include one or more wired and wireless networks, including the Internet. Implementations provide for the network 102 to be likewise accessible by a service provider server 642.

The information handling system 600 includes a processor (e.g., central processor unit or "CPU") 602, input/output (I/O) devices 604, such as a microphone, a keyboard, a video/display, a mouse, and associated controllers (e.g., K/V/M), a hard drive or disk storage 606, and various other subsystems 608. The information handling system 600 likewise includes system memory 612, which is interconnected to the foregoing via one or more buses 614. System memory 612 further comprises operating system (OS) 616 and in various embodiments one or more applications 618 configured to run the processes described herein.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Skilled practitioners of the art will recognize that many such embodiments are possible, and the foregoing is not intended to limit the spirit, scope or intent of the invention. Consequently, the invention is intended to be limited only by the spirit and scope of the appended claims, giving full cognizance to equivalents in all respects.

What is claimed is:

1. A computer-implementable method for authentication as to resources of a subscription for a customer comprising:
   receiving an order for the subscription;
   updating a distributed ledger of a main subscription channel with the subscription;
   creating private keys related to a factory service tag of the subscription;
   updating a sub distributed ledger of a factory subscription channel that is a level below the main subscription channel;
   creating private keys related to vendor licenses of the subscription;
   updating another sub distributed ledger of a vendor subscription channel that is a level below the main subscription channel;
   updating the distributed ledger of the main subscription channel with keys related to provisioning of the resources; and
   providing an authenticity view to all entities accessing the main subscription channel, based on updated main subscription channel.

2. The method of claim 1, wherein the distributed ledgers are blockchains, and updating is performed on particular blocks of the blockchains.

3. The method of claim 1, wherein the method is supported by a private cloud service of the customer.

4. The method of claim 1, wherein the subscription is supported through its lifecycle by a supply chain system.

5. The method of claim 1, wherein the factory channel is supported by factory entities of the provider of the resources.

6. The method of claim 1, wherein the vendor channel is supported by third party providers of the resources.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations for authentication as to resources of a subscription for a customer executable by the processor and configured for:
   receiving an order for the subscription;
   updating a distributed ledger of a main subscription channel with the subscription;
   creating private keys related to a factory service tag of the subscription;
   updating a sub distributed ledger of a factory subscription channel that is a level below the main subscription channel;
   creating private keys related to vendor licenses of the subscription;
   updating another sub distributed ledger of a vendor subscription channel that is a level below the main subscription channel;
   updating the distributed ledger of the main subscription channel with keys related to provisioning of the resources; and
   providing an authenticity view to all entities accessing the main subscription channel, based on updated main subscription channel.

8. The system of claim 7, wherein the distributed ledgers are blockchains, and updating is performed on particular blocks of the blockchains.

9. The system of claim 7, wherein the system is supported by a private cloud service of the customer.

10. The system of claim 7, wherein the subscription is supported through its lifecycle by a supply chain system.

11. The system of claim 7, wherein the factory channel is supported by factory entities of the provider of the resources.

12. The system of claim 7, wherein the vendor channel is supported by third party providers of the resources.

13. A non-transitory, computer-readable storage medium embodying computer program code for authentication as to resources of a subscription for a customer, the computer program code comprising computer executable instructions configured for:
   receiving an order for the subscription;
   updating a distributed ledger of a main subscription channel with the subscription;
   creating private keys related to a factory service tag of the subscription;
   updating a sub distributed ledger of a factory subscription channel that is a level below the main subscription channel;
   creating private keys related to vendor licenses of the subscription;
   updating another sub distributed ledger of a vendor subscription channel that is a level below the main subscription channel;
   updating the distributed ledger of the main subscription channel with keys related to provisioning of the resources; and
   providing an authenticity view to all entities accessing the main subscription channel, based on updated main subscription channel.

14. The non-transitory, computer-readable storage medium of claim 13, wherein the computer executable instructions are supported by a private cloud service of the customer.

15. The non-transitory, computer-readable storage medium of claim 13, wherein the subscription is supported through its lifecycle by a supply chain system.

16. The non-transitory, computer-readable storage medium of claim 13, wherein the factory channel is supported by factory entities of the provider of the resources.

17. The non-transitory, computer-readable storage medium of claim 13, wherein the vendor channel is supported by third party providers of the resources.

* * * * *